March 18, 1930.  H. FELDMEIER  1,750,997

LIQUID FILTER

Filed April 27, 1925

INVENTOR.
Harvey Feldmeier,
by Parker & Prochnow,
ATTORNEYS.

Patented Mar. 18, 1930

1,750,997

UNITED STATES PATENT OFFICE

HARVEY FELDMEIER, OF LITTLE FALLS, NEW YORK, ASSIGNOR, BY MESNE ASSIGNMENTS, TO CHERRY-BURRELL CORPORATION, OF WILMINGTON, DELAWARE, A CORPORATION OF DELAWARE

LIQUID FILTER

Application filed April 27, 1925. Serial No. 26,008.

This invention relates to liquid filters or straining devices, and more particularly to that type of filters used for purifying milk and analogous liquids in which the liquid passes through a filtering cloth or medium arranged in a closed chamber or passage so that the liquid can be forced continuously or uninterruptedly under pressure, as by means of a pump, through the filtering medium.

It is very essential in the case of filters used for milk and other liquids, which are intended for human consumption and which are also capable of supporting bacterial growth, that all parts of the filter with which the liquid contacts shall be kept in an absolutely sanitary condition. Consequently the filter should be constructed so that the parts can be readily taken apart and thoroughly cleansed after each run of the liquid through the filter, and so that a new or clean filtering cloth or material can be used after each run of the liquid, or as often as may be necessary to insure the required purity of the liquid. In order to secure the maximum filtering area with the maximum economy in a device of minimum size, the filtering cloth or material is preferably made in the form of a hollow cylinder or tube and is maintained in this form by means of a screen of corresponding form on which the filter cloth or material is removably retained, and this filtering unit or strainer, composed of the filtering cloth and its supporting screen, is arranged in a relatively narrow chamber between the walls of the filter casing or receptacle and a liquid displacement core or body so that while a large area of filtering surface is exposed to the liquid, thereby giving a large filtering capacity, nevertheless only a relatively small body of the liquid is present in the filter during the filtering operation, and only a small quantity of the liquid remains in the filter and has to be drained off when the parts of the filter are disassembled at the end of the run.

One of the objects of this invention is to produce a filter of this character and having the advantages thereof, which is of relatively compact size, simple and inexpensive construction, and is composed of the minimum number of parts, so arranged that the filter receptacle can be readily closed tightly against leakage and the filtering unit or strainer securely but removably retained in place with the joints between the ends of the same and the adjacent parts of the filter properly sealed so as to prevent leakage of the liquid around the ends of the strainer. Other objects of the invention are to provide the filter receptacle with a cover and securing means therefor, which will enable the cover to be readily placed and secured in position with a liquid tight joint between it and the filter vessel, and at the same time insure proper closure of the opposite ends of the filtering unit or strainer without liability of rumpling or displacing the filter cloth on the supporting screen or injuring the cloth; also to provide the single cover of the filter receptacle with a shell or part which forms a displacement core for the liquid; also to provide a displacement shell which forms an air chamber which absorbs the pulsations or vibrations from the liquid pump and reduces the strain on the filtering unit and other parts of the filter, and gives a more steady discharge; also to provide a hollow open ended displacement core arranged so as to equalize the pressure inside and outside of the same so that the core can be made of thinner or lighter metal; and also to improve liquid filters in the other respects hereinafter described and set forth in the claims.

In the accompanying drawings:—

Figures 1, 2, 3:
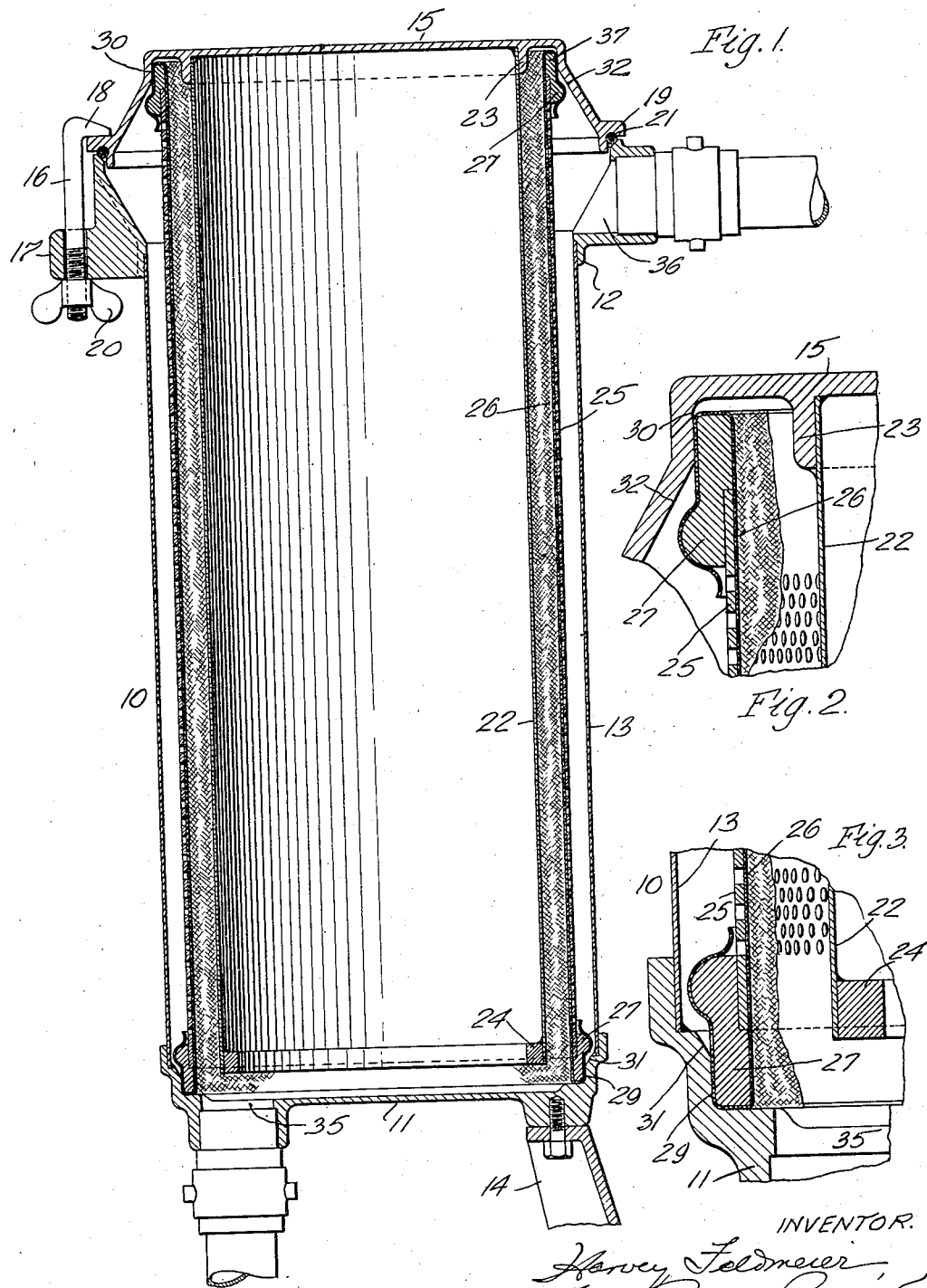
Fig. 1 is a vertical sectional elevation of a liquid filter embodying the invention.
Fig. 2 is a fragmentary sectional elevation, on an enlarged scale, of the upper portion of the filter showing the joint between the cover and the upper end of the filtering unit or strainer.
Fig. 3 is a similar sectional elevation of the lower portion of the filter showing the joint between the filter receptacle and the lower end of the filtering unit or strainer.

10 represents the filter receptacle or casing, which preferably consists of an end or base casting 11 and an upper or mouth ring or casting 12 connected by an annular or cylindrical sheet metal shell 13 brazed or otherwise suitably attached permanently at its ends to the base casting 11 and mouth ring 12. This receptacle can be provided with supporting legs, one of which is shown at 14, or it can be supported in any other suitable manner. The open or upper end of the receptacle is closed by a cover 15 which is releasably clamped or secured on the mouth ring 12 of the receptacle, preferably by clamps or fastening devices mounted on the mouth ring 12. The clamps shown consist of bolts 16 which pass loosely through holes in lugs 17 on the mouth ring 12 and are provided at their upper ends with laterally projecting hooks or portions 18 adapted to bear upon a peripheral flange or portion 19 of the cover. Wing or thumb nuts 20 turning on the screw-threaded lower ends of the clamping bolts, bear against the lugs on the mouth ring, so that by tightening these nuts the bolts can be operated to draw the cover down to a firm seat on the mouth ring. Preferably a packing gasket consisting of a round rubber ring 21 seated in a peripheral groove in the cover and adapted to bear against the bevelled edge of the mouth ring is provided to insure a liquid tight joint between the cover and the vessel when the clamping bolts are tightened. By loosening the thumb nuts, the bolts can be turned or moved to disengage their upper ends from the cover flange 19 to permit the cover to be placed on and removed from the receptacle, and since the cover flange 19 is continuous and the clamping bolts can engage with any portion thereof for securing the cover, the latter can be seated in closed position on the mouth of the receptacle by a straight, downward movement of the cover without necessitating the cover to be turned relatively to the receptacle to any particular position for securing it in place. This is an advantage in connection with the securing of the filtering unit or strainer in place, as will hereinafter appear.

22 represents a liquid displacement core or shell which is preferably secured to and carried by the cover 15, depending therefrom down into the filter receptacle, to near the bottom of the latter. As shown, this core or shell consists of a sheet metal cylinder or tube which is brazed or otherwise suitably attached at its upper end to an annular flange 23 on the underside of the cover. Preferably, the lower end of the displacement shell 22 is open and is reinforced or stiffened by a bottom ring 24, which is brazed or otherwise suitably secured to the lower end of the shell.

The filtering unit or strainer comprises an annular or cylindrical screen 25 and tubular filter cloth 26 which is arranged within and against the inner surface of the screen with its ends folded or turned outwardly over the opposite ends of the screen whereby the filter cloth is adapted to be gripped and retained in place on and supported in tubular form by the screen when the latter is secured in the filter, as presently explained. The screen preferably consists of a perforated sheet metal cylinder reinforced at its upper and lower ends by metal rings 27 suitably attached to the ends of the screen. The strainer or filtering unit thus constituted is arranged in the filter receptacle between and spaced from the annular wall thereof and the displacement core or shell 22 so as to divide the annular chamber formed in the receptacle by the displacement core into inner and outer flow spaces for the liquid at opposite sides of the strainer. The lower end of the strainer is seated and confined in a seat or depression 29 in the bottom of the receptacle and the upper end of the strainer is similarly seated and confined in a seat or depression 30 in the cover 15 of the receptacle. These seats preferably have cylindrical peripheral faces in which the ends of the cloth covered screen are adapted to telescope and fit snugly, the peripheral face of the bottom seat having a flaring or bevelled upper portion 31, while the peripheral face of the upper seat has a flaring lower portion 32, so that the ends of the screen with the filter cloth turned thereover can be readily guided into and engaged in the seats with the ends of the filter cloth fitting snugly between the screen and the seats, whereby the ends of the filter cloth will be clamped against the end rings of the screen, and the filter cloth thereby retained firmly in position on the screen. The filtering unit or strainer is placed in position in the receptacle with its lower end in the seat in the bottom of the receptacle, and the cover 15 is then placed and secured on the receptacle, thus securing the unit in position, and making tight joints between the ends of the strainer and the bottom and cover respectively of the receptacle, so as to prevent leakage of the liquid through the joints between the ends of the strainer and the bottom and cover of the receptacle. Inasmuch as the cover does not have to be turned to any particular position to secure it on the receptacle, but can be simply moved straight downwardly over the upper end of the strainer until it seats against the mouth of the receptacle, as before explained, the end of the filter cloth which is turned over the end of the screen is not apt to be twisted, rumpled or broken in placing and securing the cover on the receptacle, and thus a smooth tight fit of the end of the filter cloth between the upper end of the screen and the cover is ensured. The telescopic joints between the strainer and the bottom and cover of the receptacle, also enable the cover always to be moved down until firmly seated on the receptacle, and thus ensure a tight closure of the receptacle as well as of the ends of the strainer.

In operation, the liquid to be filtered enters the filter through an inlet 35 at the bottom of the receptacle inside of the strainer or filtering unit and leaves the filter through an outlet 36 at the upper portion of the receptacle at the outer side of the filtering unit or strainer, the inlet and outlet being provided with suitable coupling or attaching means for the ready attachment and detachment of liquid supply and discharge pipes. The liquid which is pumped or delivered to the filter under pressure thus rises in the space between the displacement core 22 and the strainer and passes through the strainer into the space surrounding the latter and discharges through the outlet connection 36. The liquid outlet or discharge connection is preferably formed on the mouth ring 12 and disposed below the upper end of the covered receptacle so that in the use of the filter an air space or chamber is left in the cover or upper end of the filter. By leaving the lower end of the displacement core open, as explained, an air chamber is also provided inside of the displacement core or shell which cooperates with the air chamber in the cover to form an air cushion that relieves the strainer and other parts of the filter from strain due to the pulsations of the liquid pump and ensures a steadier discharge of the liquid. This construction also equalizes the pressure inside and outside of the displacement shell so that the shell can be made of relatively light thin material. If the displacement core should happen to become perforated or develop a leak, this could do no harm because the liquid rises part way up into the interior chamber of the shell in the ordinary use of the apparatus, and the displacement core is open so that it can be readily cleaned when the receptacle is opened and the core removed. If the displacement shell or core was formed by a closed hollow body, the pressure on the inside and outside of the same would not be equalized and the core or shell would have to be made of heavier material, or if the core should develop a leak permitting the liquid to get into the core, it would be impossible to properly clean the interior of the core, and the liquid would be apt to foul and make the filter unsanitary.

I claim as my invention:

1. The combination of a receptacle open at its upper end, a movable cover for the upper end of the receptacle, means for tightly securing said cover in closed position, a liquid displacement core carried by said cover and projecting into said receptacle and forming an annular chamber therein around the core, an annular strainer dividing said annular chamber into inner and outer flow spaces for the liquid, said strainer being removably retained in place by engagement with the lower end and cover of said receptacle, and liquid inlet and outlet connections one communicating with said inner flow space and the other with said outer flow space.

2. The combination of a receptacle open at its upper end, a movable cover for the upper end of the receptacle, means for tightly securing said cover in closed position, a removable liquid displacement core in said receptacle and forming an annular chamber therein around the core, said core being hollow and having an open lower end communicating with said annular chamber whereby an air pressure chamber is formed in said core, a removable annular strainer dividing said annular chamber into inner and outer flow spaces for the liquid, and liquid inlet and outlet connections one communicating with said inner flow space and the other with said outer flow space.

3. The combination of a receptacle open at its upper end, a movable cover for the upper end of the receptacle, means for tightly securing said cover in closed position, a liquid displacement core carried by said cover and projecting into said receptacle and forming an annular chamber therein around the core, said core being hollow and having an open lower end communicating with said annular chamber whereby an air chamber is formed in said core and the pressure equalized inside and outside of the core, a removable annular strainer dividing said annular chamber into inner and outer flow spaces for the liquid, and liquid inlet and outlet connections one communicating with said inner flow space and the other with said outer flow space.

4. The combination of a receptacle open at its upper end, a movable cover for the upper end of the receptacle, means for tightly securing said cover in closed position, a liquid displacement core carried by said cover and projecting into said receptacle and forming an annular chamber therein around the core, said core being hollow and having an open lower end communicating with said annular chamber whereby an air chamber is formed in said core and the pressure equalized inside and outside of the core, an annular strainer dividing said annular chamber into inner and outer flow spaces for the liquid, said strainer being removably retained in place by engagement with the lower end and cover of said receptacle, and liquid inlet and outlet connections one communicating with said inner flow space and the other with said outer flow space.

5. The combination of a receptacle open at its upper end, a movable cover for the upper end of the receptacle, means for tightly securing said cover in closed position, a liquid displacement core carried by said cover and projecting into said receptacle and forming an annular chamber therein around the core, an annular strainer dividing said annular chamber into inner and outer flow spaces for the liquid, said strainer comprising a screen and a filter tube having its ends turned over the ends of the screen, the ends of said strainer telescopically fitting seats in the lower end and cover of said receptacle for securing said filter tube in place, and liquid inlet and outlet connections one communicating with said inner flow space and the other with said outer flow space.

6. A filter comprising a casing having an inner displacement core dividing the interior of the casing into an annular chamber, and an inner chamber closed at its upper end, a strainer element in said annular chamber for dividing it into two non-communicating annular sub-chambers, means for conducting a liquid under pressure to be filtered into the inner one of said sub-chambers, that sub-chamber and the inner chamber having a connection at their lower portions whereby the air trapped in said inner chamber will be subjected to the pressure of the ingoing liquid and will function as a pneumatic cushion therefor, and means for removing from the other of said sub-chambers the liquid which passes through the filter element.

7. A filter comprising a casing having an inlet adjacent its lower end and an outlet at a point spaced therefrom, a filter element disposed across the interior of the casing and forcing any liquid passing between the inlet and outlet to pass through it, and a hollow displacement element closed at its top disposed in said casing adjacent to but spaced from the inlet face of the filter element to form a relatively thin channel along the filter element, the lower part of the displacement element being connected to the inlet whereby the pressure inside and outside of the displacement element will be equalized, the air trapped in the displacement element will serve as a pneumatic cushion for the ingoing liquid, and any ingoing liquid leaking through into the displacement element will drain out automatically.

8. The combination of a receptacle open at one end, and having a removable cover for said open end, securing devices for securing said cover removably to the open end of the receptacle, said receptacle having therein and adjacent opposite ends thereof inwardly facing cylindrical seats, and a strainer comprising a cylindrical open ended screen and a flexible filter tube within the screen, said tube having its ends turned outwardly over the ends of the screen and snugly engaged between the screen and seats, whereby as the strainer is assembled in telescopic arrangement with a seat, the folded over end of said tube at that seat will be engaged and drawn taut in a direction farther over said end by its friction with that seat.

9. The combination of a receptacle open at one end and having a removable cover for said open end, means for securing said cover removably to the open end of the receptacle, said receptacle having therein at opposite ends inwardly facing cylindrical seats, a tubular cylindrical filtering unit disposed in said receptacle with its ends snugly fitting telescopically within said annular seats, and means connected to said receptacle for admitting fluid to be filtered under pressure to said receptacle at the inside of said unit, and for removing it from the receptacle at the outside of said unit.

HARVEY FELDMEIER.